(12) United States Patent
Nakagawa et al.

(10) Patent No.: US 10,775,218 B2
(45) Date of Patent: Sep. 15, 2020

(54) PLANT EVALUATION DEVICE AND PLANT EVALUATION METHOD

(71) Applicant: MITSUBISHI HEAVY INDUSTRIES, LTD., Tokyo (JP)

(72) Inventors: Yosuke Nakagawa, Tokyo (JP); Naohiko Ishibashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 238 days.

(21) Appl. No.: 16/082,746

(22) PCT Filed: Dec. 9, 2016

(86) PCT No.: PCT/JP2016/086809
§ 371 (c)(1),
(2) Date: Sep. 6, 2018

(87) PCT Pub. No.: WO2017/154301
PCT Pub. Date: Sep. 14, 2017

(65) Prior Publication Data
US 2019/0154487 A1    May 23, 2019

(30) Foreign Application Priority Data

Mar. 9, 2016    (JP) ................................. 2016-045639

(51) Int. Cl.
*G06F 11/30*     (2006.01)
*G01F 7/00*      (2006.01)
*G05B 23/02*     (2006.01)

(52) U.S. Cl.
CPC ............... *G01F 7/00* (2013.01); *G05B 23/02* (2013.01); *G05B 23/0205* (2013.01)

(58) Field of Classification Search
CPC ......................................................... G06F 7/10
See application file for complete search history.

(56) References Cited

U.S. PATENT DOCUMENTS

2013/0211871 A1* 8/2013 Ghosh .................... G06Q 10/06
705/7.28

FOREIGN PATENT DOCUMENTS

EP          2933648       * 10/2015
EP          2933648 A1    10/2015
(Continued)

OTHER PUBLICATIONS

Extended European Search Report issued in corresponding European Application No. 16893625.0, dated Oct. 25, 2019 (7 pages).

*Primary Examiner* — Phuong Huynh
(74) *Attorney, Agent, or Firm* — Osha Liang LLP

(57) ABSTRACT

A plant evaluation apparatus includes: a first computation unit configured to compute a first estimated value of a plant state quantity by using a steady-state model; a first determination unit configured to compute a second estimated value of the plant state quantity by assigning an equipment parameter in a normal state to an equipment parameter of a non-steady-state model; a second computation unit configured to compute a third estimated value of the plant state quantity by using the steady-state model in a case where the first determination unit determines that an error between the second estimated value and an actually measured value is equal to or more than a threshold value; and a second determination unit configured to determine whether or not a difference between the equipment parameter in the normal state and the equipment parameter in an abnormal state is equal to or more than a predetermined value.

6 Claims, 5 Drawing Sheets

(56) References Cited

FOREIGN PATENT DOCUMENTS

| JP | 2009-282804 A | 12/2009 |
|----|---------------|---------|
| JP | 2010-271890 A | 12/2010 |

\* cited by examiner

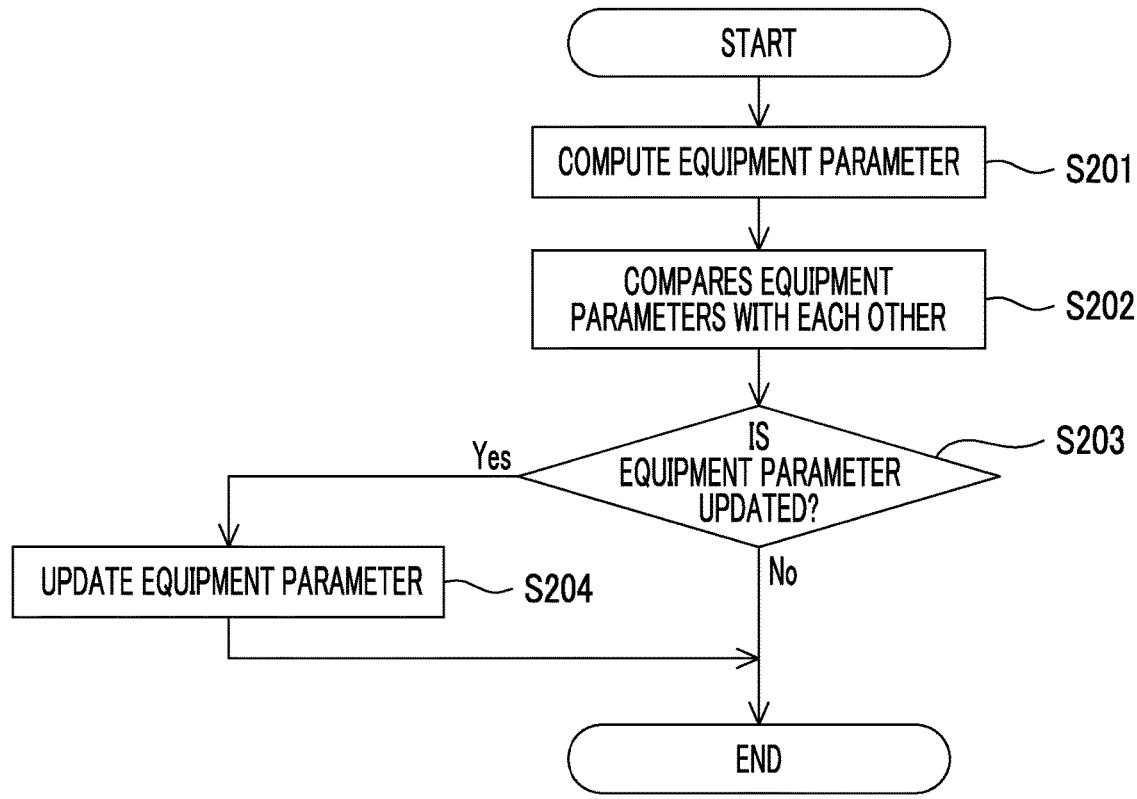
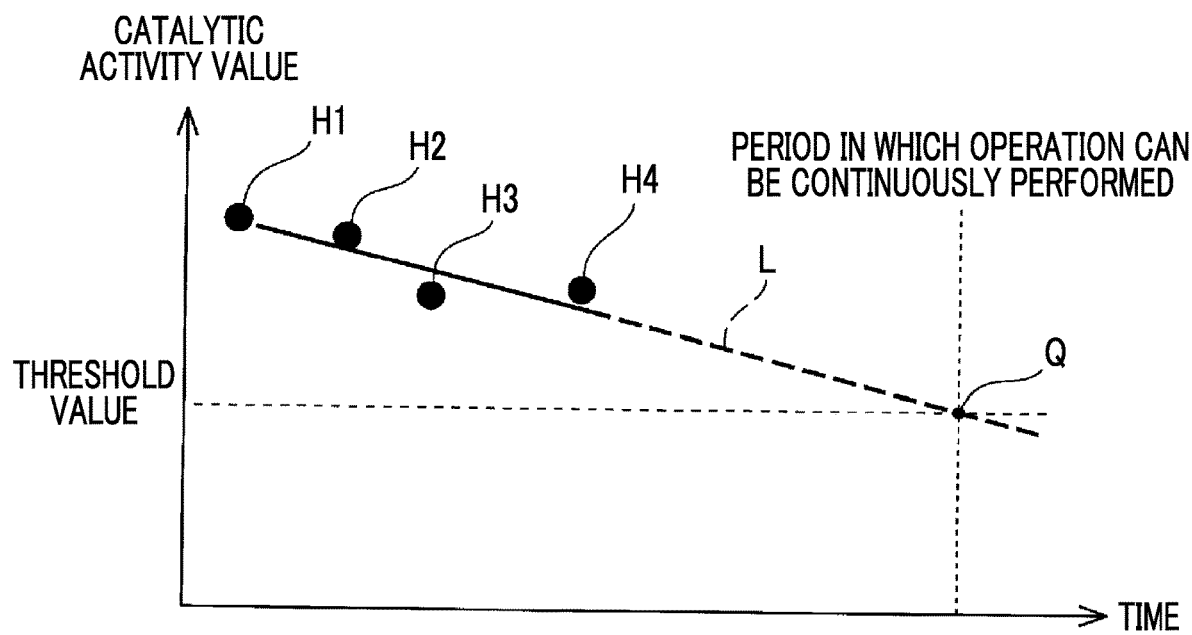

PLANT EVALUATION DEVICE AND PLANT EVALUATION METHOD

TECHNICAL FIELD

The present invention relates to a plant evaluation apparatus and a plant evaluation method.

BACKGROUND ART

There is a case where simulation using a plant model is performed for the purpose of an optimal operation for a plant such as a chemical plant. PTL 1 discloses a simulation device including a tracking model part, an identification model part, an analysis model part, and a comparison/determination unit. The comparison/determination unit has, in advance, information regarding a parameter which is to be corrected with an identification model in a case where an error occurs in measurement data and prediction data.

CITATION LIST

Patent Literature

[PTL 1] Japanese Unexamined Patent Application Publication No. 2009-282804

SUMMARY OF INVENTION

Technical Problem

The simulation device of the related art has, in advance, information regarding a parameter which is to be corrected with an identification model in a case where an error occurs. However, there is a probability that a correction location cannot be specified by using only information set in advance, depending on an error occurrence factor.

An object of the present invention is to solve the problem, and to efficiently estimate a cause of the occurrence of abnormality in a plant according to an error between an estimated value and an actually measured value of a plant state quantity.

Solution to Problem

In order to achieve the object, according to an aspect of the present invention, there is provided a plant evaluation apparatus including a first computation unit configured to compute a first estimated value of a plant state quantity by using a steady-state model indicating a mathematical relationship in a steady state between an equipment parameter and the plant state quantity of plant equipment, and to compute the equipment parameter of the plant equipment according to a difference between the first estimated value of the plant state quantity and an actually measured value of the plant state quantity, the computed equipment parameter being preserved as an equipment parameter in a normal state; a first determination unit configured to compute a second estimated value of the plant state quantity by assigning the equipment parameter in the normal state to an equipment parameter of a non-steady-state model by using the non-steady-state model indicating a mathematical relationship in a non-steady state between the equipment parameter and the plant state quantity of the plant equipment, and to determine whether or not an error between the second estimated value of the plant state quantity and the actually measured value of the plant state quantity is equal to or more than a predetermined threshold value; a second computation unit configured to compute a third estimated value of the plant state quantity by using the steady-state model in a case where the first determination unit determines that the error between the second estimated value of the plant state quantity and the actually measured value of the plant state quantity is equal to or more than the threshold value, and to computes an equipment parameter of the plant equipment according to a difference between the third estimated value of the plant state quantity and the actually measured value of the plant state quantity, the computed equipment parameter being preserved as an equipment parameter in an abnormal state; and a second determination unit configured to determine whether or not a difference between the equipment parameter in the normal state and the equipment parameter in the abnormal state is equal to or more than a predetermined value.

The plant evaluation apparatus may further include a prediction unit configured to predict a future change of the equipment parameter on the basis of the history of a computation result of the equipment parameter in the second computation unit.

According to another aspect of the present invention, there is provided a plant evaluation apparatus including a computation unit configured to compute an estimated value of a plant state quantity by using a steady-state model indicating a mathematical relationship in a steady state between an equipment parameter and the plant state quantity of plant equipment, and to compute the equipment parameter of the plant equipment according to a difference between the estimated value of the plant state quantity and an actually measured value of the plant state quantity; and an update unit configured to compare an equipment parameter after computation with an equipment parameter before computation in the computation unit, and to update the equipment parameter according to a comparison result.

The plant evaluation apparatus may further include a prediction unit configured to predict a future change of the equipment parameter on the basis of the history of a computation result of the equipment parameter in the computation unit.

In order to achieve the object, according to still another aspect of the present invention, there is provided a plant evaluation method including a first computation step of computing a first estimated value of a plant state quantity by using a steady-state model indicating a mathematical relationship in a steady state between an equipment parameter and the plant state quantity of plant equipment, and computing the equipment parameter of the plant equipment according to a difference between the first estimated value of the plant state quantity and an actually measured value of the plant state quantity, the computed equipment parameter being preserved as an equipment parameter in a normal state; a determination step of computing a second estimated value of the plant state quantity by assigning the equipment parameter in the normal state to an equipment parameter of a non-steady-state model by using the non-steady-state model indicating a mathematical relationship in a non-steady state between the equipment parameter and the plant state quantity of the plant equipment, and determining whether or not an error between the second estimated value of the plant state quantity and the actually measured value of the plant state quantity is equal to or more than a predetermined threshold value; a second computation step of computing a third estimated value of the plant state quantity by using the steady-state model in a case where it is determined that the error between the second estimated value of the plant state quantity and the actually measured value of the plant state quantity is equal to or more than the threshold value, and computing an equipment parameter of the plant equipment according to a difference between the third estimated value of the plant state quantity and the actually measured value of the plant state quantity, the computed equipment parameter being preserved as an equipment parameter in an abnormal state; and a second determination step of determining whether or not a difference between the equipment parameter in the normal state and the equipment parameter in the abnormal state is equal to or more than a predetermined value.

The plant evaluation method may further include a prediction step of predicting a future change of the equipment parameter on the basis of the history of a computation result of the equipment parameter in the second computation step.

According to still another aspect of the present invention, there is provided a plant evaluation method including a computation step of computing an estimated value of a plant state quantity by using a steady-state model indicating a mathematical relationship in a steady state between an equipment parameter and the plant state quantity of plant equipment, and computing the equipment parameter of the plant equipment according to a difference between the estimated value of the plant state quantity and an actually measured value of the plant state quantity; and an update step of comparing an equipment parameter after computation with an equipment parameter before computation in the computation step, and updating the equipment parameter according to a comparison result.

The plant evaluation method may further include a prediction step of predicting a future change of the equipment parameter on the basis of the history of a computation result of the equipment parameter in the computation step.

Advantageous Effects of Invention

It is possible to efficiently estimate a cause of the occurrence of abnormality in a plant according to an error between an estimated value and an actually measured value of a plant state quantity.

BRIEF DESCRIPTION OF DRAWINGS

FIG. 7 is a flowchart illustrating a flow of another process performed by the plant evaluation apparatus.

FIG. 8 is a graph illustrating a predicted equipment parameter.

DESCRIPTION OF EMBODIMENTS

Hereinafter, embodiments of the present invention will be described. However, the present invention is not limited to the following embodiments.

[Plant]

Figure 1:
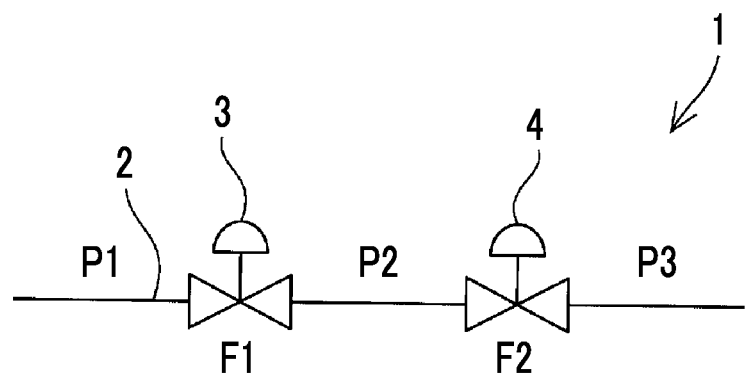
FIG. 1 is an explanatory diagram illustrating a configuration example of a plant.

First, a description will be made of an example of a plant which is an evaluation target. As illustrated in FIG. 1, a plant 1 includes a pipe 2, and a first valve 3 and a second valve 4 which adjust a flow rate of a fluid flowing through the pipe 2. The first valve 3 is provided further toward the upstream side than the second valve 4. The pipe 2, the first valve 3, and the second valve 4 are all pieces of plant equipment.

A pipe pressure on the upstream side of the first valve 3 is indicated by P1, a pipe pressure (or an intermediate part pressure) on the downstream side of the first valve 3 and the upstream side of the second valve 4 is indicated by P2, and a pipe pressure on the downstream side of the second valve 4 is indicated by P3. As an example, the pipe pressures P1 and P3 are assumed to be constant, and the pipe pressure P2 is assumed to be change over time.

A flow rate of a fluid flowing through the first valve 3 is indicated by F1, and a flow rate of a fluid flowing through the second valve 4 is indicated by F2. The flow rates F1 and F2 are plant state quantities indicating a state of the plant 1, and are control targets in process control of the plant 1. The pipe pressures P1 to P3 are also plant state quantities. A valve opening degree of the first valve 3 is indicated by X1, and a valve opening degree of the second valve 4 is indicated by X2. The valve opening degrees X1 and X2 are operation amounts in process control of the plant 1.

A flow rate coefficient of the first valve 3 is indicated by CV1, and a flow rate coefficient of the second valve 4 is indicated by CV2. The flow rate coefficients CV1 and CV2 are all equipment parameters of the pieces of plant equipment.

First Embodiment

Figure 2:
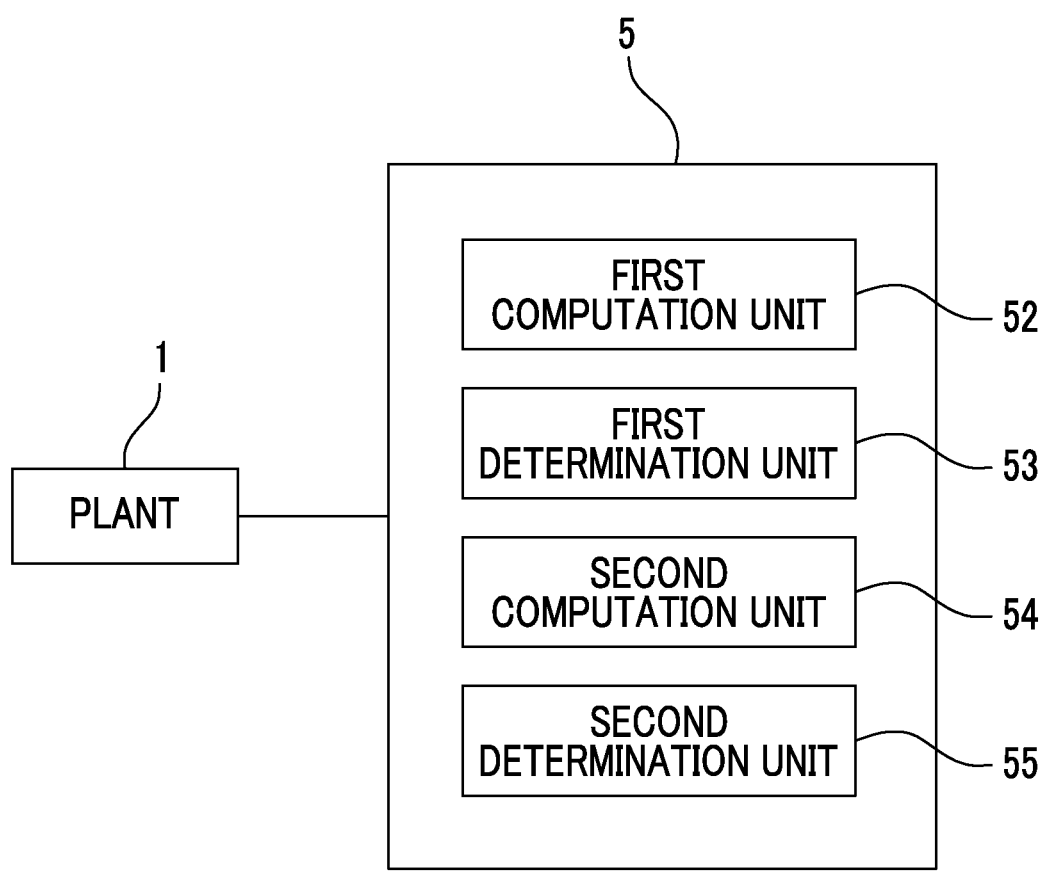
FIG. 2 is an explanatory diagram illustrating a functional configuration example of a plant evaluation apparatus.

FIG. 2 illustrates a plant evaluation apparatus 5 evaluating the plant 1. The plant evaluation apparatus 5 can acquire actually measured data from the plant 1 online or offline, and includes a first computation unit 52, a first determination unit 53, a second computation unit 54, and a second determination unit 55. Details of each functional unit will be described later.

Figure 3:
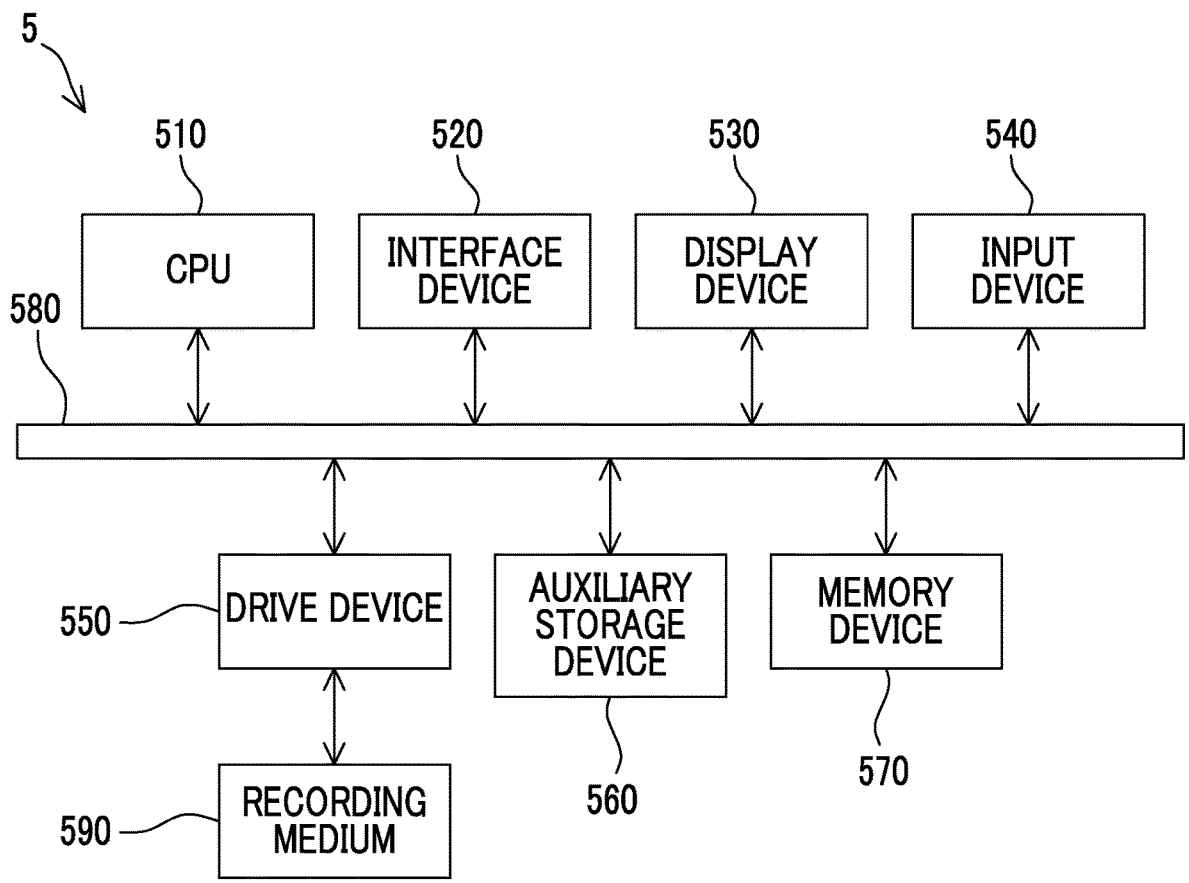
FIG. 3 is an explanatory diagram illustrating a computer hardware configuration example of the plant evaluation apparatus.

FIG. 3 illustrates a computer hardware configuration example of the plant evaluation apparatus 5. The plant evaluation apparatus 5 includes a CPU 510, an interface device 520, a display device 530, an input device 540, a drive device 550, an auxiliary storage device 560, and a memory device 570, which are connected to each other via a bus 580.

A program for realizing a function of the plant evaluation apparatus 5 is provided by a recording medium 590 such as a CD-ROM. In a case where the recording medium 590 recording the program is set in the drive device 550, the program is installed in the auxiliary storage device 560 from the recording medium 590 via the drive device 550. Alternatively, the program is not necessarily installed by using the recording medium 590, and may be downloaded from another computer via a network. The auxiliary storage device 560 stores the installed program, and stores, for example, necessary files or data.

In a case where there is an instruction for activating the program, the memory device 570 reads the program from the auxiliary storage device 560, and stores the program therein. The CPU 510 realizes the function of the plant evaluation apparatus 5 according to the program stored in the memory device 570. The interface device 520 is used as an interface for connection to other computers via the network. The display device 530 displays a graphical user interface (GUI) based on the program. The input device 540 is, for example, a keyboard and a mouse.

Figure 4:
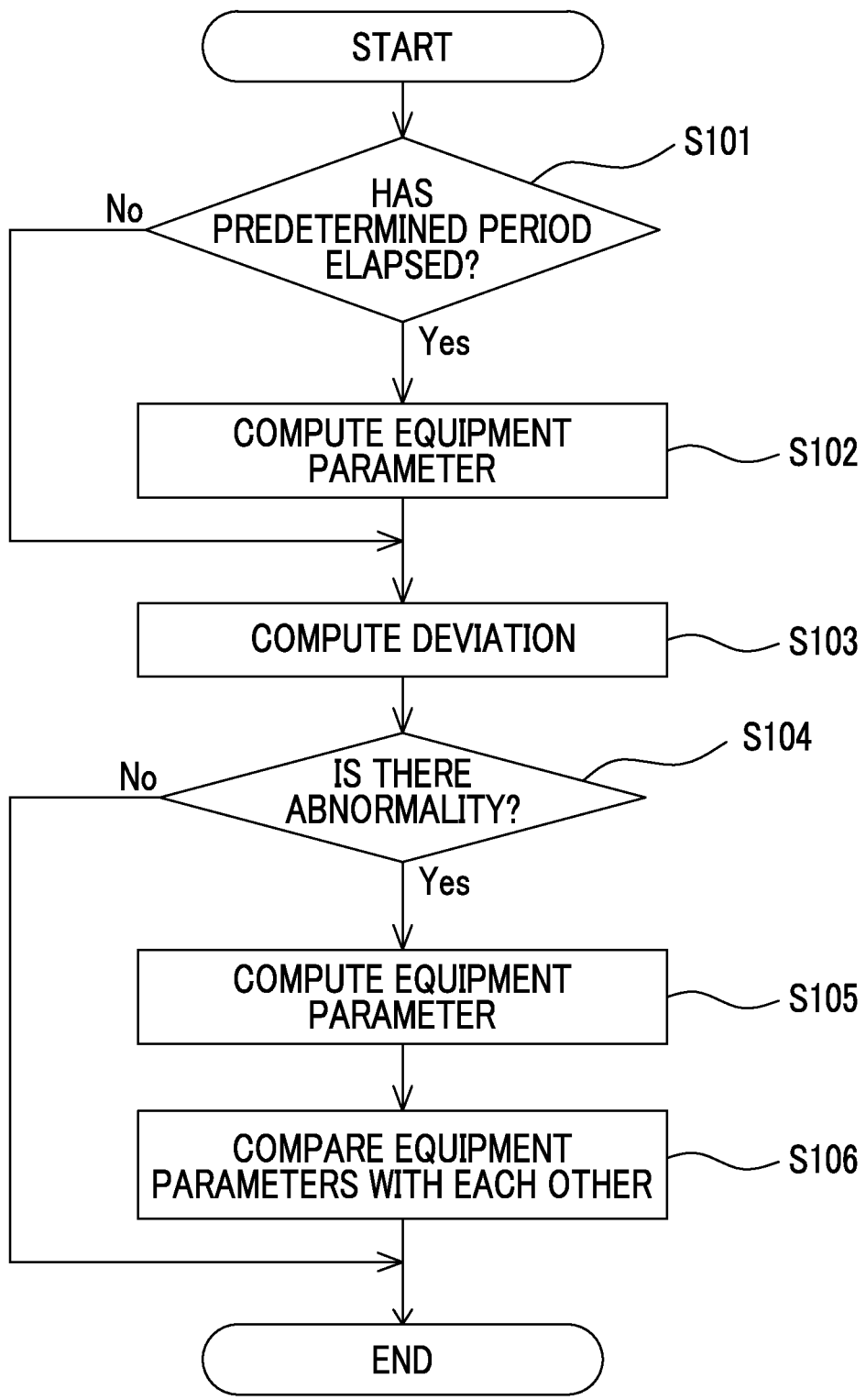
FIG. 4 is a flowchart illustrating a flow of a process performed by the plant evaluation apparatus.

Hereinafter, with reference to FIG. 4, a description will be made of a process performed by the plant evaluation apparatus 5. This process is periodically performed.

First, in step S101, the first computation unit 52 determines whether or not a predetermined period has elapsed from the last computation of the equipment parameters. In a case where it is determined that the predetermined period has elapsed, step S102 is skipped, and step S103 is performed. Computation of the equipment parameters will be described later.

In step S102, the first computation unit 52 computes a first estimated value $F1_1$ of the flow rate (plant state quantity) F1, a first estimated value $F2_1$ of the flow rate F2, and a first estimated value $P2_1$ of the intermediate part pressure P2, by using a steady-state model. The steady-state model is a plant model indicating a mathematical relationship in a steady state between an equipment parameter of plant equipment and a plant state quantity. The first computation unit 52 computes the estimated values $F1_1$, $F2_1$, and $P2_1$ according to the following computation formulae.

$$0.0 = F1_1 - F2_1 \quad (1)$$

$$F1_1 = CV1 \cdot X1 \cdot \sqrt{P1 - P2_1} \quad (2)$$

$$F2_1 = CV2 \cdot X2 \cdot \sqrt{P2_1 - P3} \quad (3)$$

Specifically, the computation is performed as follows.

$F1_1$ is the same as $F2_1$ on the basis of Equation (1), and, if Equations (2) and (3) are respectively assigned thereto, this leads to $CV1 \cdot X1 \cdot \sqrt{(P1-P2_1)} = CV2 \cdot X2 \cdot \sqrt{(P2_1-P3)}$. If both sides are squared, this leads to $(CV1 \cdot X1)^2 \cdot (P1-P2_1) = (CV2 \cdot X2)^2 \cdot (P2_1-P3)$, that is, $P2_1 = \{(CV1 \cdot X1)^2 \cdot P1 + (CV2 \cdot X2)^2 \cdot P3\}/\{(CV1 \cdot X1)^2 + (CV2 \cdot X2)^2\}$. If the obtained $P2_1$ is assigned to Equations (2) and (3), $F1_1$ and $F2_1$ are obtained.

In nonlinear simultaneous equations, generally, it is hard to obtain analysis solutions (solutions represented by equations) as above. Thus, an approximate solution is generally obtained by using various numerical analysis methods.

As mentioned above, in the steady-state model, the estimated values F11, F21, and P21 are computed by using such simultaneous relationship Equations (1) to (3).

The flow rate coefficients CV1 and CV2 are obtained on the basis of design conditions or an equipment parameter update result which will be described later. The valve opening degrees X1 and X2 and the pipe pressures P1 and P3 are obtained on the basis of actually measured values. In a case where there is no actually measured value, an experience value or an assumed value is given.

In this step, the first computation unit 52 receives, from the plant 1, at least one of input of a flow rate actually measured value $F1_r$ which is an actually measured value of the flow rate F1, input of a flow rate actually measured value $F2_r$ which is an actually measured value of the flow rate F2, and a pressure actually measured value $P2_r$ which is an actually measured value of the intermediate part pressure P2. Next, the first computation unit 52 computes a sum value of a difference between the first estimated value $F1_1$ and the flow rate actually measured value $F1_r$ of the flow rate F1, a difference between the first estimated value $F2_1$ and the flow rate actually measured value $F2_r$ of the flow rate F2, and a difference between the first estimated value $P2_1$ and the pressure actually measured value $P2_r$ of the intermediate part pressure P2. In a case where there is an actually measured value which is not received from the plant 1, a difference between the actually measured value and a corresponding estimated value is zero. As the sum value of the differences, a sum of square differences is preferably taken. The first computation unit 52 computes values of the flow rate coefficients CV1 and CV2 causing the sum value to be the minimum. In a case where the sum value is zero, accurate equipment parameters, that is, the flow rate coefficients are reproduced, but the sum value is not zero practically, equipment parameters causing the sum value to be the minimum are regarded as optimal equipment parameters.

The first computation unit 52 preserves each of the computed flow rate coefficients CV1 and CV2 in the memory device 570 as an equipment parameter in a normal state. Of course, the flow rate coefficients may be preserved in any storage device other than the memory device 570. This preservation is also referred to as update of the equipment parameters.

However, in a case where abnormality such as a loss is included in actually measured data or computation is performed by using an actually measured value which is not in a steady state, the equipment parameters are not updated.

As mentioned above, computation of the equipment parameters in this step is performed by using the steady-state models as shown in Equations (1) to (3) such that an error in the entire plant system is the minimum.

In step S103, the first determination unit 53 computes a second estimated value $F1_2$ of the flow rate (plant state quantity) F1, a second estimated value $F2_2$ of the flow rate F2, and a second estimated value $P2_2$ of the intermediate part pressure P2, by using a non-steady-state model. The non-steady-state model is a plant model indicating a mathematical relationship in a non-steady state between an equipment parameter of plant equipment and a plant state quantity. Computation formulae are given as follows.

$$\frac{dP2}{dt} = \alpha \cdot (F1_2 - F2_2) \quad (4)$$

$$P2_2 = P2old + \frac{dP2}{dt} \cdot dt \quad (5)$$

$$F1_2 = CV1 \cdot X1 \cdot \sqrt{P1 - P2_2} \quad (6)$$

$$F2_2 = CV2 \cdot X2 \cdot \sqrt{P2_2 - P3} \quad (7)$$

Here, the constant $\alpha$ in Equation (4) is a response coefficient of pressure. P2old in Equation (5) is a pressure at the previous computation (the previous time) in non-steady-state computation, and the estimated value $P2_2$ obtained according to Equation (5) in the previous time. In addition, dt indicates a differentiation time (computation time interval). The equipment parameter (an equipment parameter updated by the first computation unit 52) CV1 in a normal state is assigned to the flow rate coefficient (equipment parameter) CV1 in Equation (6). The equipment parameter (an equipment parameter updated by the first computation unit 52) CV2 in a normal state is assigned to the flow rate coefficient (equipment parameter) CV2 in Equation (7). The valve opening degrees X1 and X2 and the pipe pressures P1 and P3 are obtained on the basis of actually measured values. In a case where there is no actually measured value, an experience value or an assumed value is given.

As mentioned above, in the non-steady-state model, the time derivative term dP2/dt is computed as shown in Equation (4), and the estimated value $P2_2$ is computed according to Equation (5) by using the time derivative term. Next, the estimated values $F1_2$ and $F2_2$ are computed according to Equations (6) and (7) by using the computed estimated value $P2_2$.

Both of the steady-state model shown in Equations (1) to (3) and the non-steady-state model shown in Equations (4) to (7) are mathematical models indicating physical phenomena (process response) of the plant. However, both of the models are different from each other in that a time derivative term is taken into consideration in the non-steady-state model, but a time derivative term is handled to be zero in the steady-state model as shown in Equation (1).

Figure 5:
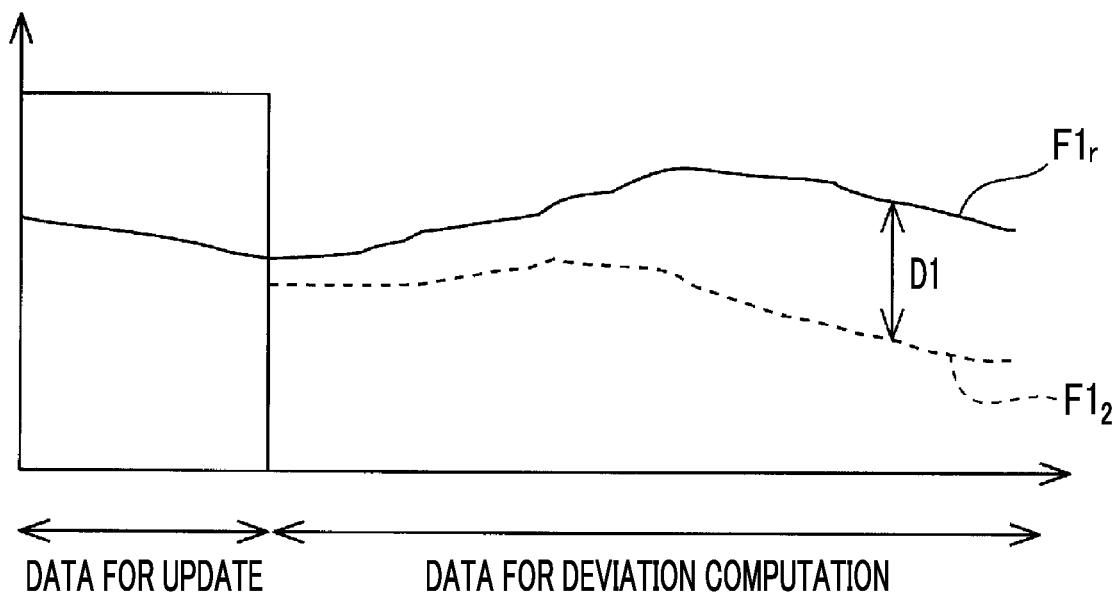
FIG. 5 is a graph illustrating temporal changes of an actually measured value and an estimated value of a plant state quantity.

In this step, the first determination unit 53 computes a difference between the second estimated value $F1_2$ and the flow rate actually measured value $F1_r$ of the flow rate (plant state quantity) F1. This difference is referred to as a first deviation. An example of the first deviation is indicated by the reference sign D1 in FIG. 5. The first determination unit 53 also computes a difference between the second estimated value $F2_2$ and the flow rate actually measured value $F2_r$ of the flow rate (plant state quantity) F2. This difference is referred to as a second deviation. The first determination unit 53 also computes a difference between the second estimated value $P2_2$ and the pressure actually measured value $P2_r$ of the pressure (plant state quantity) P2. This difference is referred to as a third deviation. In a case where there is no actually measured value, deviations are not computed.

In step S104, the first determination unit 53 determines whether or not at least one of the first deviation, the second deviation, and the third deviation exceeds a predetermined value. In a case where a determination result is positive, it is determined that abnormality occurs in the plant 1, step S105 is skipped, and the present process is finished.

In step S105, the second computation unit 54 computes a third estimated value $F1_3$ of the flow rate (plant state quantity) F1, a third estimated value $F2_3$ of the flow rate F2, and a third estimated value $P2_3$ of the intermediate part pressure P2, by using the steady-state model. The second computation unit 54 computes the estimated values $F1_3$ and $F2_3$ according to the following computation formulae.

$$0.0 = F1_3 - F2_3 \quad (8)$$

$$F1_3 = CV1 \cdot X1 \cdot \sqrt{P1 - P2_3} \quad (9)$$

$$F2_3 = CV2 \cdot X2 \cdot \sqrt{P2_3 - P3} \quad (10)$$

The flow rate coefficients CV1 and CV2 are obtained on the basis of the computed equipment parameters or equipment parameter update results which will be described later. The valve opening degrees X1 and X2 and the pipe pressures P1 and P3 are obtained on the basis of actually measured values. In a case where there is no actually measured value, an experience value or an assumed value is given.

In this step, the second computation unit 54 receives, from the plant 1, at least one of input of the flow rate actually measured value $F1_r$ which is an actually measured value of the flow rate F1, input of the flow rate actually measured value $F2_r$ which is an actually measured value of the flow rate F2, and the pressure actually measured value $P2_r$ which is an actually measured value of the intermediate part pressure P2. Next, the second computation unit 54 computes a sum value of a difference between the third estimated value $F1_3$ and the flow rate actually measured value $F1_r$ of the flow rate F1, a difference between the third estimated value $F2_3$ and the flow rate actually measured value $F2_r$ of the flow rate F2, and a difference between the third estimated value $P2_3$ and the pressure actually measured value $P2_r$ of the intermediate part pressure P2. As the sum value of the differences, a sum of square differences is preferably taken. The second computation unit 54 computes values of the flow rate coefficients CV1 and CV2 causing the sum value to be the minimum.

The second computation unit 54 preserves (updates) each of the computed flow rate coefficients CV1 and CV2 in the memory device 570 as an equipment parameter in an abnormal state. Of course, the flow rate coefficients may be preserved in any storage device other than the memory device 570.

However, in a case where abnormality such as a loss is included in actually measured data or computation is performed by using an actually measured value which is not in a steady state, the equipment parameters are not updated.

As mentioned above, computation of the equipment parameters in this step is performed by using the steady-state models as shown in Equations (8) to (10) such that an error in the entire plant system is the minimum.

In step S106, the second determination unit 55 determines whether or not a difference between the equipment parameter in a normal state obtained in step S102 and the equipment parameter in an abnormal state obtained in step S105 is equal to or more than a predetermined value. Specifically, the second determination unit 55 computes a difference between the flow rate coefficient CV1 in a normal state and the flow rate coefficient CV1 in an abnormal state, and determines whether or not the difference is equal to or more than the predetermined value. The second determination unit 55 computes a difference between the flow rate coefficient CV2 in a normal state and the flow rate coefficient CV2 in an abnormal state, and determines whether or not the difference is equal to or more than the predetermined value.

Thereafter, the second determination unit 55 specifies a flow rate coefficient (equipment parameter) in which the difference between a normal state and an abnormal state is determined as being equal to or more than the predetermined value.

The equipment parameters in a normal state obtained in step S102 and the equipment parameters in an abnormal state obtained in step S105 are used in step S103 which is performed in a case where a determination result in step S101 in the next time is "No". Specifically, in a case where it is determined that there is no abnormality in step S104, the equipment parameters are regarded almost not to change, and thus an equipment parameter in a normal state at that time is used in step S103 which is performed in a case where a determination result in step S101 in the next time is "No". In contrast, in a case where it is determined that there is abnormality in step S104, in order to obtain an equipment parameter in which the latest state is reflected, the equipment parameter in an abnormal state at the time is used in step S103 which is performed in a case where a determination result in step S101 in the next time is "No".

According to the present embodiment, it is possible to estimate a cause of abnormality in the plant and to evaluate the degree of abnormality in a quantitative manner on the basis of an equipment parameter in which a difference between a normal state and an abnormal state is equal to or more than a predetermined value. In steps S102 and S105, equipment parameters in the entire plant system are updated. In other words, since the equipment parameters are not locally updated, it is possible to reduce a possibility that a cause of abnormality cannot be found. The equipment parameter update is a process requiring a relatively high computation load, but is performed only during execution of step S105 except for step S102 which is performed every predetermined period, and thus it is possible to suppress an increase in a computation load.

Second Embodiment

Figure 6:
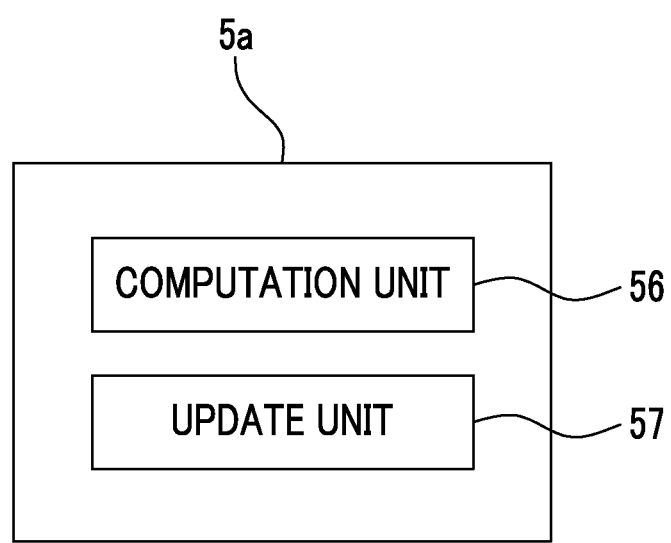
FIG. 6 is an explanatory diagram illustrating a functional configuration example of a plant evaluation apparatus according to another embodiment.

FIG. 6 illustrates a plant evaluation apparatus 5a according to another embodiment. As illustrated, the plant evaluation apparatus 5a includes a computation unit 56 and an update unit 57. FIG. 7 illustrates a flow of a process performed by the plant evaluation apparatus 5a. The present process is periodically performed.

First, in step S201, the computation unit 56 computes equipment parameters. This computation is the same as in step S102.

In step S202, the update unit 57 compares equipment parameters before and after computation performed by the computation unit 56 with each other. The equipment parameter before computation is an equipment parameter obtained through the previous computation in the computation unit 56. In step S203, the update unit 57 determines whether or not the equipment parameter is updated to a value computed in step S201. A determination criterion therefor is that abnormality such as a loss is not included in actually measured data, or an actually measured value is in a steady state. In a case where a determination result in step S203 is "Yes", the equipment parameter is updated in step S204.

According to the present embodiment, equipment parameters are compared with each other in step S202, and thus it is possible to efficiently estimate a cause of abnormality in the plant on the basis of a comparison result. According to the present embodiment, it is possible to perform plant evaluation without using a non-steady-state model requiring a relatively high computation load.

Third Embodiment

In a case where there is slight abnormality which does not impede a plant operation in the equipment parameter in an abnormal state, obtained in the first embodiment, the plant operation may be continuously performed. In this case, the plant evaluation apparatus 5 may further include a prediction unit (not illustrated). The prediction unit predicts a future change of an equipment parameter on the basis of the history of a computation result of the equipment parameter in the second computation unit 54.

FIG. 8 illustrates a relationship between a catalytic activity value which is an example of an equipment parameter and time. The prediction unit derives a straight line L indicating a future change of the catalytic activity value on the basis of points H1 to H4 representing the history of computation results. A least square method or a spline interpolation may be used to derive the straight line L. It is possible to predict a period in which a plant operation can be continuously performed on the basis of an intersection Q between the straight line L and a threshold value indicating a minimum value of the catalytic activity value for the plant operation. It is possible to monitor a rapid change of an equipment parameter.

The plant evaluation apparatus 5a may further include a prediction unit (not illustrated). The prediction unit predicts a future change of an equipment parameter on the basis of the history of a computation result of the equipment parameter in the computation unit 56.

Regarding an effect common to the first to third embodiments, it is possible to estimate a cause of an abnormal state regardless of the presence or absence of a correlation operation which may be a cause of an error. It is possible to quantitatively evaluate the degree of plant abnormality. Since an equipment parameter is updated in the entire plant system, and thus local parameter update is not performed, it is possible to reduce a possibility that a cause of abnormality cannot be found.

[Others]

In the embodiments, the plant in which a plurality of equipment parameters are present has been described as an example, but at least one equipment parameter may be present.

A flow rate has been described as an example of a state quantity, but is not limited thereto. Any quantity which can be measured such as a temperature or a pressure may be used as a state quantity. An operation target in process control is not limited to a valve, and may be any plant equipment.

Examples of equipment parameters, a flow rate coefficient and a catalytic activity value have been described. However, these are only examples, and any equipment parameter such as a heat transfer coefficient of a heat exchanger or a pressure loss of a pipe may be used for plant evaluation.

A functional configuration of the plant evaluation apparatus is not limited to the above-described aspects, and, for example, each piece of means may be integrated and mounted, or, conversely, may be further distributed and mounted.

The embodiments also have an aspect of a plant evaluation method performed by the plant evaluation apparatus.

The specific embodiments of the present invention have been described, but the present invention is not limited to the embodiments, and various modifications based on the technical spirit of the present invention are included in the concept of the present invention.

REFERENCE SIGNS LIST

1 PLANT
2 PIPE
3 FIRST VALVE
4 SECOND VALVE
5 PLANT EVALUATION APPARATUS
52 FIRST COMPUTATION UNIT
53 FIRST DETERMINATION UNIT
54 SECOND COMPUTATION UNIT
55 SECOND DETERMINATION UNIT
56 COMPUTATION UNIT
57 UPDATE UNIT

The invention claimed is:

1. A plant evaluation apparatus comprising:
a first computation unit configured to compute a first estimated value of a plant state quantity by using a steady-state model indicating a mathematical relationship in a steady state between an equipment parameter and the plant state quantity of a plant equipment, and to compute the equipment parameter of the plant equipment according to a difference between the first estimated value of the plant state quantity and an actually measured value of the plant state quantity, the computed equipment parameter being preserved as an equipment parameter in a normal state;
a first determination unit configured to compute a second estimated value of the plant state quantity by assigning the equipment parameter in the normal state to an equipment parameter of a non-steady-state model by using the non-steady-state model indicating a mathematical relationship in a non-steady state between the equipment parameter and the plant state quantity of the plant equipment, and to determine whether or not an error between the second estimated value of the plant state quantity and the actually measured value of the plant state quantity is equal to or more than a predetermined threshold value;

a second computation unit configured to compute a third estimated value of the plant state quantity by using the steady-state model in a case where the first determination unit determines that the error between the second estimated value of the plant state quantity and the actually measured value of the plant state quantity is equal to or more than the threshold value, and to compute an equipment parameter of the plant equipment according to a difference between the third estimated value of the plant state quantity and the actually measured value of the plant state quantity, the computed equipment parameter being preserved as an equipment parameter in an abnormal state; and a second determination unit configured to determine whether or not a difference between the equipment parameter in the normal state and the equipment parameter in the abnormal state is equal to or more than a predetermined value.

2. The plant evaluation apparatus according to claim 1, further comprising:

a prediction unit configured to predict a future change of the equipment parameter on the basis of the history of a computation result of the equipment parameter in the second computation unit.

3. A plant evaluation apparatus comprising:

a computation unit configured to compute an estimated value of a plant state quantity by using a steady-state model indicating a mathematical relationship in a steady state between an equipment parameter and the plant state quantity of a plant equipment, and to compute the equipment parameter of the plant equipment according to a difference between the estimated value of the plant state quantity and an actually measured value of the plant state quantity; and an update unit configured to compare an equipment parameter after computation with an equipment parameter before computation in the computation unit, and to update the equipment parameter according to a comparison result.

4. The plant evaluation apparatus according to claim 3, further comprising:

a prediction unit configured to predict a future change of the equipment parameter on the basis of the history of a computation result of the equipment parameter in the computation unit.

5. A plant evaluation method comprising:

computing a first estimated value of a plant state quantity by using a steady-state model indicating a mathematical relationship in a steady state between an equipment parameter and the plant state quantity of a plant equipment;

computing the equipment parameter of the plant equipment according to a difference between the first estimated value of the plant state quantity and an actually measured value of the plant state quantity, the computed equipment parameter being preserved as an equipment parameter in a normal state;

computing a second estimated value of the plant state quantity by assigning the equipment parameter in the normal state to an equipment parameter of a non-steady-state model by using the non-steady-state model indicating a mathematical relationship in a non-steady state between the equipment parameter and the plant state quantity of the plant equipment;

determining whether or not an error between the second estimated value of the plant state quantity and the actually measured value of the plant state quantity is equal to or more than a predetermined threshold value;

computing a third estimated value of the plant state quantity by using the steady-state model in a case where it is determined that the error between the second estimated value of the plant state quantity and the actually measured value of the plant state quantity is equal to or more than the threshold value, in the determination step;

computing an equipment parameter of the plant equipment according to a difference between the third estimated value of the plant state quantity and the actually measured value of the plant state quantity, the computed equipment parameter being preserved as an equipment parameter in an abnormal state; and determining whether or not a difference between the equipment parameter in the normal state and the equipment parameter in the abnormal state is equal to or more than a predetermined value.

6. The plant evaluation method according to claim 5, further comprising:

predicting a future change of the equipment parameter on the basis of the history of a computation result of the equipment parameter in the second computation step.

* * * * *